US005457993A

United States Patent [19]
Sapuppo

[11] Patent Number: 5,457,993
[45] Date of Patent: Oct. 17, 1995

[54] PENDULOUS OSCILLATING GYROSCOPIC ACCELEROMETER

[76] Inventor: Michele S. Sapuppo, 7 Regis Rd., Andover, Mass. 01810

[21] Appl. No.: 101,392

[22] Filed: Aug. 3, 1993

[51] Int. Cl.$^6$ ..................................................... G01P 9/04
[52] U.S. Cl. .......................................... 73/504.02; 73/510
[58] Field of Search .......................... 73/504, 505, 510, 73/517 R, 517 B, 382, 1 D; 33/321, 346; 74/5.34

[56] References Cited

U.S. PATENT DOCUMENTS

| | | | |
|---|---|---|---|
| 2,902,772 | 9/1959 | Ciscel | 33/321 |
| 3,083,578 | 4/1963 | Rosato et al. | 73/504 |
| 3,492,735 | 2/1970 | Burdick et al. | 33/321 |
| 3,931,747 | 1/1976 | Erspamer | 74/5.34 |
| 4,270,387 | 6/1981 | Hoffman | 73/504 |
| 4,599,896 | 7/1986 | Stewart | 73/517 R |

FOREIGN PATENT DOCUMENTS

| | | | |
|---|---|---|---|
| 1109615 | 4/1968 | United Kingdom | 73/504 |
| 1109634 | 4/1968 | United Kingdom | 73/517 R |

Primary Examiner—Hezron E. Williams
Assistant Examiner—Helen C. Kwok
Attorney, Agent, or Firm—Brian M. Dingman

[57] ABSTRACT

A pendulous oscillating gyroscopic accelerometer comprising an unbalanced pendulous mass, pivotable on an output axis, that is oscillated about a reference axis transverse to the output axis. The pendulous mass is also oscillated about an input axis transverse to the reference axis, and the acceleration force along the input axis is determined from at least one of those oscillations.

24 Claims, 9 Drawing Sheets

FIG. 3A  $m\ell a_{IA}$

FIG. 3B  $\underset{(IXW_S)}{H}$

FIG. 3C  $W_{IA}$

FIG. 3D  $H \times W_{IA}$

FIG. 4A  $m\ell a_{IA}$

FIG. 4B  $H$ $(I \times W_S)$

FIG. 4C  $W_{IA}$

FIG. 4D  $H \times W_{IA}$

FIG. 5A  $m\ell a_{IA}$

TIME

FIG. 5B  $H$ $(I \times W_S)$

FIG. 5C  $W_{IA}$

FIG. 5D  $H \times W_{IA}$     $m\ell a_{IA}$

FIG. 6A $m\ell a_{IA}$

FIG. 6B $H$ $(I \times W_S)$

FIG. 6C $W_{IA}$

FIG. 6D $H \times W_{IA}$

FIG. 7A  $m\ell a_{IA}$

FIG. 7B  $H$ ($1 \times W_S$)

FIG. 7C  $W_{IA}$

FIG. 7D  $H \times W_{IA}$

FIG. 8A  $m\ell a_{IA}$

FIG. 8B  $H$ $(I \times W_S)$

FIG. 8C  $W_{IA}$

FIG. 8D  $H \times W_{IA}$   $m\ell a_{IA}$

PENDULOUS OSCILLATING GYROSCOPIC ACCELEROMETER

FIELD OF INVENTION

This invention relates to a pendulous gyroscopic accelerometer that develops pendulous torque and gyroscopic torque using oscillation rather than rotation.

BACKGROUND OF INVENTION

The gyroscopic integrating accelerometer was first disclosed in U.S. Pat. No. 1,940,387, "Gyroscopic Pendulum". The gyroscopic integrating accelerometer has a purposely unbalanced spinning gyroscope wheel that develops pendulous torque when it is accelerated along the input axis. The device then develops gyroscopic torque to balance out the pendulous torque. The angle of precession is proportional to the integral with respect to time of the acceleration along the input axis. Accordingly, by detecting the change in angle of the spin axis, the device is useful for determining acceleration along the input axis.

The concept of the pendulous integrating gyroscope was further developed after World War II. The pendulous integrating gyroscope accelerometer incorporates a purposely unbalanced, viscously damped, single degree of freedom gyroscope. The unbalance or pendulosity is made by offsetting the gyro wheel or by adding a pendulous mass along the spin axis. The pendulosity torque acting on the torque summing member of the gyroscope, caused by gravity or a specific force input such as acceleration, is counterbalanced by gyroscope precessional torque acting on the torque summing member in the opposing direction as a result of the rotation of the gyroscope about its input axis. The velocity of the gyroscope rotation is a direct indication of the acceleration being sensed. This device has a threshold sensitivity in the nano gravity range, and an operational range of 8 to 10 orders of magnitude.

There are a number of problems with the pendulous integrating gyroscope accelerometer, however, that have kept it from becoming an inexpensive, small, mass-producible device that can be used in commercial applications as opposed to defense and government applications in which cost is less of an issue. First, the rotating gyroscope wheel must be supported by bearings that will eventually wear. Additionally, the device requires a slip ring assembly to transfer power and excitations to the gyroscope assembly. This is another major failure mode associated with pendulous gyroscopic accelerometers. The devices also have a large number of parts which require extensive precision machining and assembly time. They also require a heavy viscous fluid for flotation and damping, and low viscosity fluid to partially float the weight of the gyroscope assembly and to lubricate the slip rings and bearings, both of which add to the number of assembly steps and thus the cost. Other problems with the device include the relatively large size and weight and the relatively large amount of operating power required to rotate the momentum mass and gyroscope assembly.

SUMMARY OF INVENTION

It is therefore an object of this invention to provide a low-cost pendulous gyroscopic accelerometer.

It is a further object of this invention to provide an easy to fabricate pendulous gyroscopic accelerometer.

It is a further object of this invention to provide a pendulous gyroscopic accelerometer that has fewer wear out modes.

It is a further object of this invention to provide a pendulous gyroscopic accelerometer that requires less power to operate.

It is a further object of this invention to provide a pendulous gyroscopic accelerometer that may be fabricated using two-dimensional batch fabrication technology such as lithographic millimachining.

It is a further object of this invention to provide a pendulous gyroscopic accelerometer that does not require a slip ring assembly.

It is a further object of this invention to provide a pendulous gyroscopic accelerometer that does not require bearings.

It is a further object of this invention to provide a pendulous gyroscopic accelerometer that does not require heavy viscous fluid in the pendulous gyroscope for floating and damping.

It is a further object of this invention to provide a pendulous gyroscopic accelerometer that does not require a low viscosity fluid in the sealed assembly to lubricate the slip ring and bearings.

It is a further object of this invention to provide a pendulous gyroscopic accelerometer that is smaller and lighter by at least a factor of 10 than current pendulous gyroscopic accelerometers.

This invention results from the realization that a very small light weight pendulous gyroscopic accelerometer may be accomplished by oscillating the gyroscope wheel at resonant frequency, and oscillating the gyroscope case at resonant frequency to develop the angular momentum and rate input to the gyroscope.

This invention features a pendulous oscillating gyroscopic accelerometer which in one embodiment comprises a momentum mass, an unbalanced pendulous mass pivotable on an output axis, means for oscillating the momentum mass about a reference axis transverse to the output axis, means for oscillating the momentum mass and the pendulous mass about another input axis transverse to the reference axis, and means, responsive to at least one of the means for oscillating, for determining acceleration force along the input axis.

In one embodiment, the oscillations of the momentum mass about both the reference and input axes are at the same oscillation frequency. In that case, the oscillations may be in phase, and the means for determining acceleration may include means for resolving the pendulous mass movement about the output axis. The means for determining acceleration may then further include means, responsive to the means for resolving the momentum mass movement about the output axis, for altering the oscillation amplitude of the momentum mass about the input axis to generate precessional torque to counter balance the pendulosity torque.

In another embodiment, the oscillations of the momentum mass about the reference and the input axes are each of constant amplitude and the same frequency. In that case, the means for determining acceleration may include means for resolving the pendulous mass movement about the output axis. The means for determining acceleration in this case may further include means, responsive to the means for resolving, for altering the phase relationship between the momentum mass oscillations about the reference and input axes to generate precessional torque to counterbalance the pendulosity torque.

The momentum mass may include a disc centered on the reference axis, and the pendulosity may be created by an unbalanced disc or a pendulosity mass centered on the reference axis that is on the disc. The device may further include a torque summing member for carrying the momentum mass. Further included may be a pendulous gyroscope case for carrying the torque summing member, in which case the torque summing member may be pivotably mounted to the gyroscope case along the output axis. In that case there may further be included pivot mounting means to mount the gyroscope case along the input axis, and the means for oscillating the momentum mass about the input axis may then include means for oscillating the gyroscope case on the pivot mounting means. The means for oscillating the momentum mass about the reference axis may include means in the torque summing member for oscillating the momentum mass, or means in the gyroscope case for oscillating the momentum mass.

The reference axis is preferably perpendicular to the input axis. The means for determining acceleration force may include means for resolving the tilt angle of the pendulous mass about the output axis. The pendulous mass may alternatively include an unbalanced beam member pivotable on the output axis.

In a more specific embodiment, the pendulous oscillating gyroscopic accelerometer of this invention includes an unbalanced disc member, a torque summing member for carrying the disc member, and means for oscillating the disc member about a reference axis. Further included is a pendulous gyroscope case and a pair of pivot mounts for pivotably mounting the torque summing member to the gyroscope case to allow the torque summing member and the disc member it carries to pivot on an output axis perpendicular to the reference axis. Further included are means for resolving the angle of the pivoting movement of the torque summing member in relation to the gyroscope case. There is a fixed member and one or more flexure mounts for pivotably, flexibly mounting the gyroscope case to the fixed member to allow the gyroscope case to pivot about an input axis perpendicular to the reference axis. There are one or more oscillating members for applying torque to the flexure mounts to oscillate the gyroscope case about the input axis. This embodiment further includes means, responsive to the means for resolving the angle of the pivot movement of the torque summing member in relation to the gyroscope case, for determining acceleration force along the input axis.

This embodiment may be accomplished in the case in which the oscillations of the disc member and the gyroscope case are at the same oscillation frequency and are in phase. In that case, the means for determining acceleration may include means for altering the oscillation amplitude of the gyroscope case or the disc member to generate precessional torque to counterbalance the pendulosity torque.

This embodiment alternatively includes the case in which the oscillations of the disc member and the gyroscope case are each of constant amplitude and the same frequency. In that case, the means for determining acceleration may include means for altering the phase relationship between the oscillation of the disc member and the gyroscope case to generate precessional torque to counterbalance the pendulosity torque.

DISCLOSURE OF PREFERRED EMBODIMENTS

Other objects, features and advantages will occur to those skilled in the art from the following description of a preferred embodiment and the accompanying drawings in which.

DETAILED DESCRIPTION OF THE INVENTION

Figure 1A:
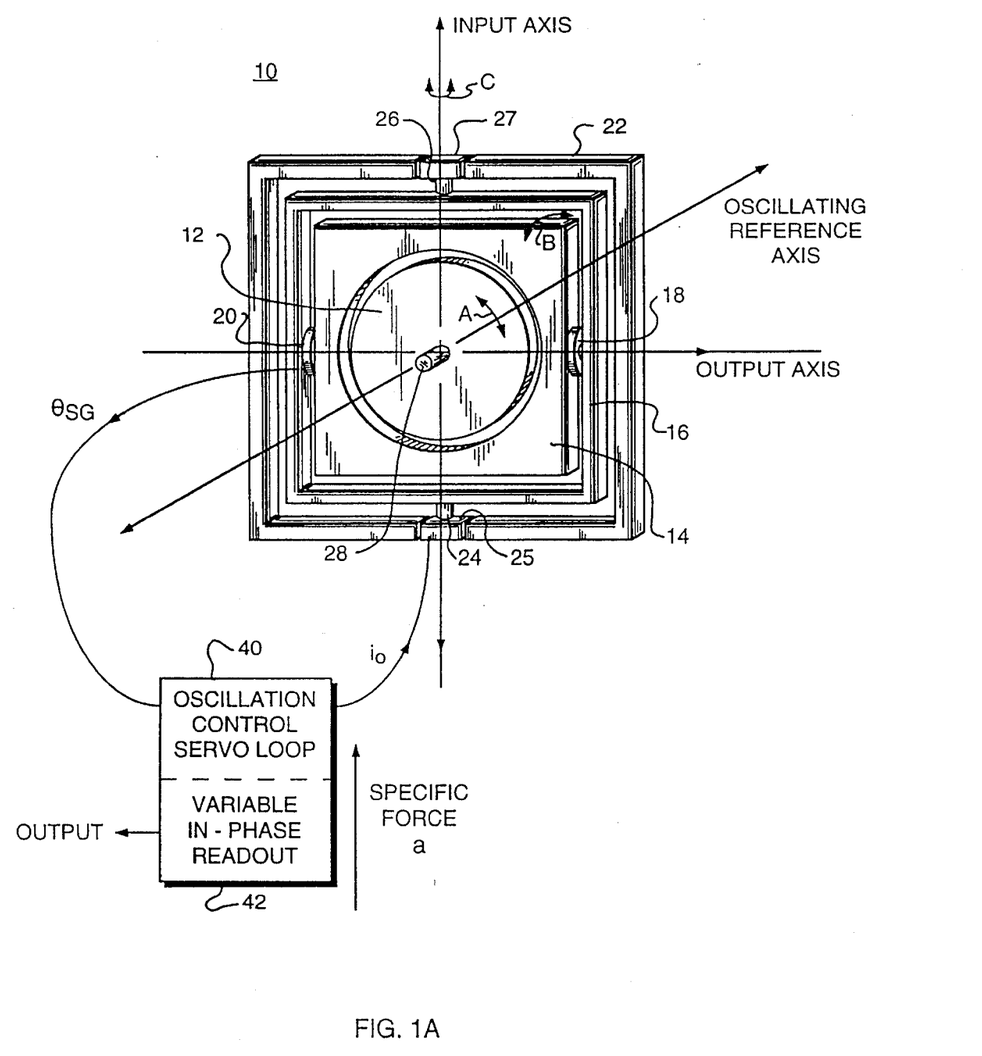
FIG. 1A is an axonometric, schematic view of a pendulous oscillating gyroscopic accelerometer according to this invention.

There is shown in FIG. 1A pendulous oscillating gyroscopic accelerometer 10 according to this invention. Device 10 includes disc or wheel 12 that is oscillated about the oscillating reference axis as shown by arrow A. Disc 12 is a momentum mass that rides within torque summing member 14 which itself is pivotably mounted to pendulous gyroscope case 16 by mounts 18 and 20 that allow member 14 to pivot about the output axis as shown by arrow B. Gyro case 16 is itself pivotably attached to fixed member 22 through mounts 24 and 26 and oscillating member 25 and 27, respectively, that oscillate gyro case 16 about the input axis as shown by arrow C.

The pendulosity in this case is created by mass 28 that may be fixed to disc 12 or torque summing member 14. The pendulosity is acted upon by a specific force a acting along the input axis. Oscillation control servo loop 40 has as its input the tilt angle of torque summing member 14 in relation to case 16 as member 14 pivots about the output axis. Servo loop 40 provides in response a current $i_o$ that is used to drive oscillators 25 and 27 to develop gyroscopic torque to counter balance the pendulosity. Alternatively, a single oscillator could be used. The pendulosity is balanced by the gyroscope precessional torque which is created by the cross-product of the momentum of momentum mass 12 and the oscillating input rate of the gyroscope case 16 about the input axis. Read out 42 is optional for one operational mode in which the oscillations are in-phase as more fully described below. In each operational case, an output from servo loop 40 is used as an indication of acceleration force a along the direction of the input axis.

Figure 1B:
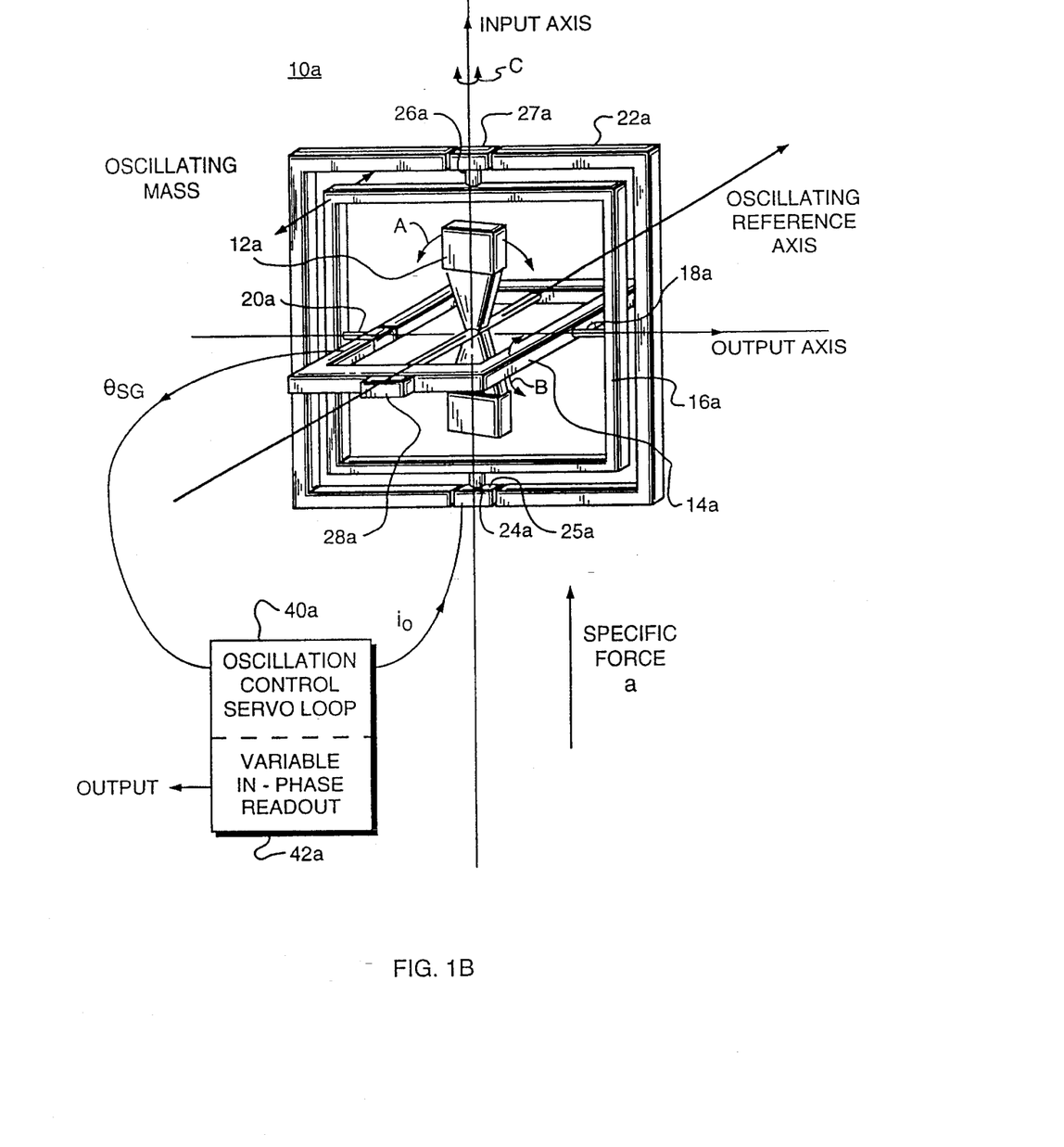
FIG. 1B is a similar view of an alternate design for the accelerometer of this invention.

FIG. 1B is a schematic diagram of an alternative design of the pendulous oscillating gyroscopic accelerometer 10a of this invention. In this case, the oscillating mass 12a is in the form of a vibrating beam that oscillates about the oscillating reference axis as shown by arrow A. Torque summing member 14a carries pendulous mass 28a. The tilt angle of torque summing member 14a about the output axis is detected at pivot 20a.

Accelerometer 10a includes gyroscope case 16a to which torque summing member 14a is pivotably mounted by mounts 18a and 20a that allow member 14a to pivot about the output axis as shown by arrow B. Torque summing member 14a in this case carries mass 28a which creates the pendulosity. Gyroscope case 16a is itself pivotably attached to fixed member 22a through mounts 24a and 26a and oscillating members 25a and 27a, respectively, that oscillate gyroscope case 16a about the input axis as shown by arrow C. Oscillation control servo loop 40a has as its input the tilt angle of torque summing member 14a in relation to case 16a as member 14a pivots about the output axis. Servo loop 40a provides in response a current $i_0$ that is used to drive oscillators 25a and 27a to develop gyroscopic torque to counter balance the pendulosity. Read-out 42a is optional for one operational mode in which the oscillations are in-phase as is more fully described below.

Figure 2:
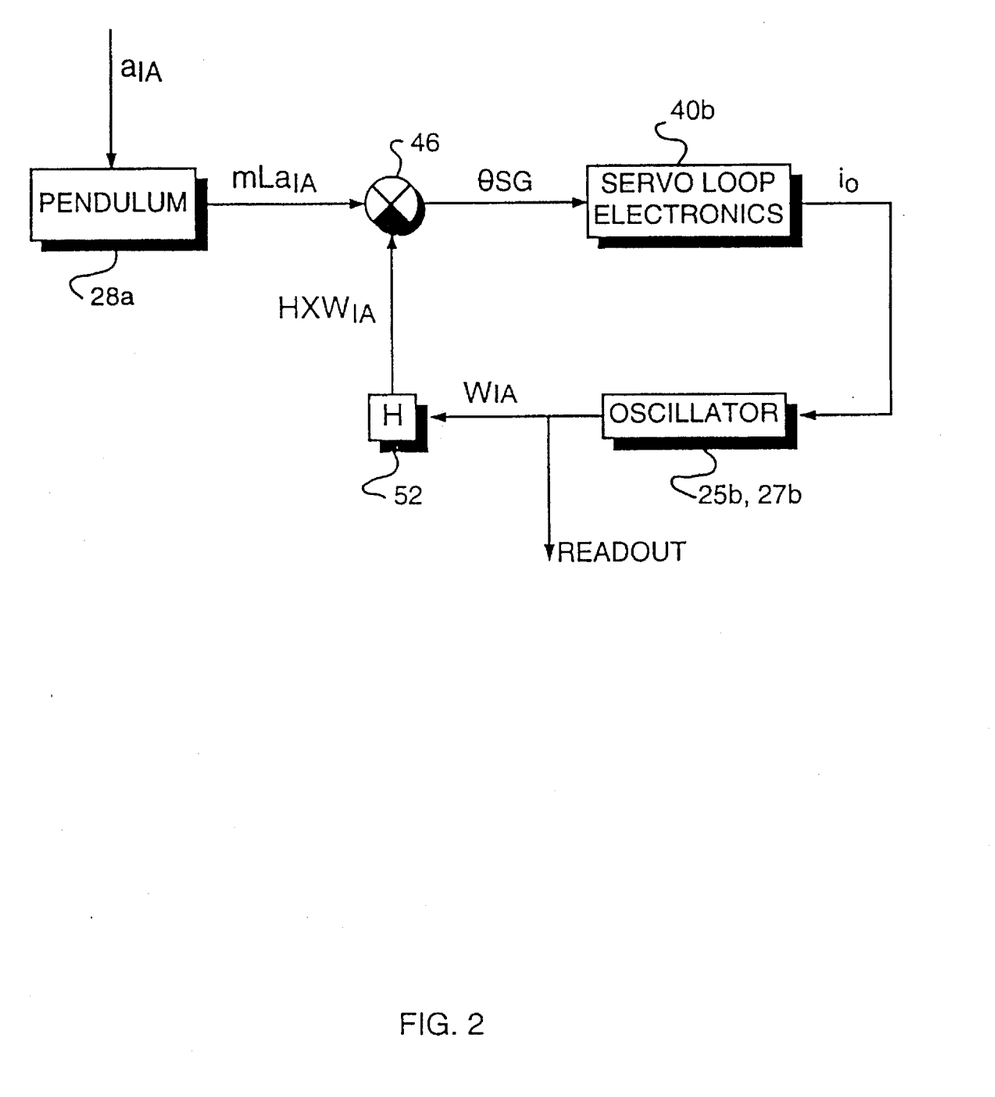
FIG. 2 is a block diagram of the accelerometer of FIGS. 1A and 1B.

The theory of operation of the pendulous oscillating gyroscopic accelerometer of this invention is more fully understandable by viewing the block diagram of the device, FIG. 2, along with the graphs of FIGS. 3 through 8. The FIG. 2 block diagram of the pendulous oscillating gyroscopic accelerometer of this invention shows force $a_{IA}$ (the specific force along input axis IA) acting on pendulous mass 28a to create a pendulous torque $mLa_{IA}$ provided to summer 46. $\Theta_{SG}$ is the angle reading from the signal generator built in to pivot 20 that indicates the angle of member 14 in relation to case 16. In response to this detected angle, servo loop electronics 40b outputs a current to drive oscillators 25b and 27b to oscillate gyro case 16 about the input axis to develop gyroscopic torque to counter balance the pendulosity of pendulum 28a. The gyroscope precessional torque is the cross product of the oscillating wheel angular momentum H and the oscillation of the gyroscope case about the input axis, $W_{IA}$.

There are at least two conditions under which the oscillating gyroscope will react with the oscillating momentum mass to produce precessional torque that will in turn counterbalance the pendulous torque. In both situations, the momentum mass and the gyroscope must oscillate at the same frequency. The phase relationship between these two oscillations defines the precessional torque.

In the first operational case illustrated in FIGS. 3 through 5, the oscillation of the momentum mass and the gyroscope case are 100% in-phase. Changes in precessional torque to balance out pendulous torque changes produced by varying acceleration inputs are reflected in changing angular amplitude of the gyroscope oscillation.

Figure 3A:
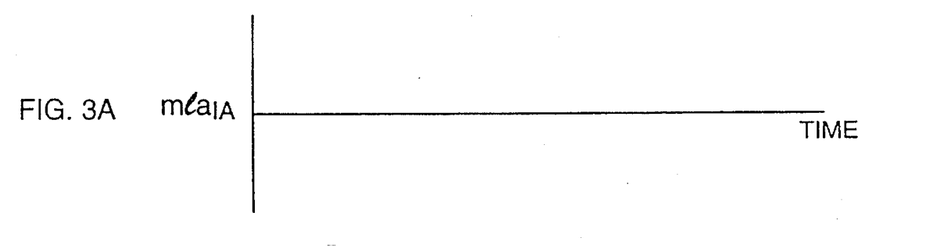
FIGS. 3A through 3D are graphs of the pendulous torque, the oscillating wheel angular momentum, the oscillation of the gyroscope case about the input axis, and the gyroscopic torque developed about the output axis, respectively, of the device of FIGS. 1A and 1B for in-phase oscillation operation of the device with variable gyro angular amplitude, for the case of zero specific force input.
Figure 3B:
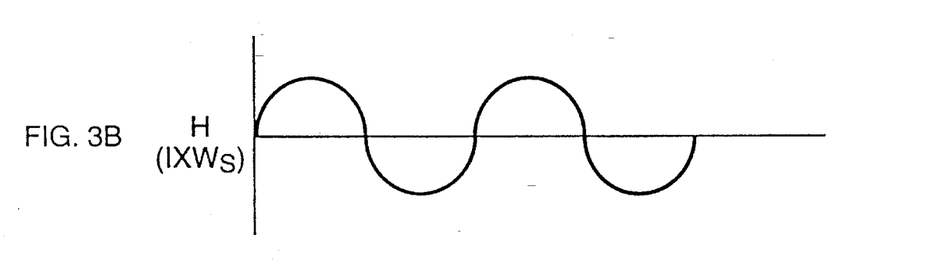
Figure 3C:
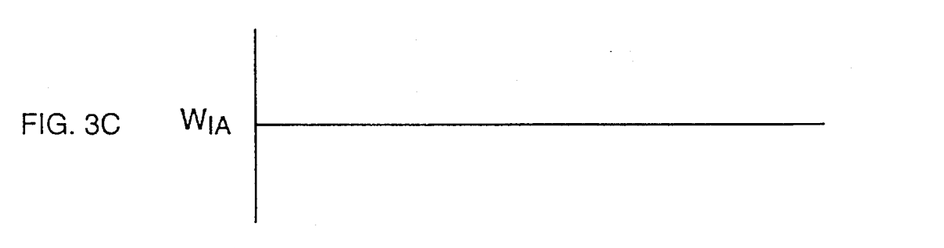
Figure 3D:
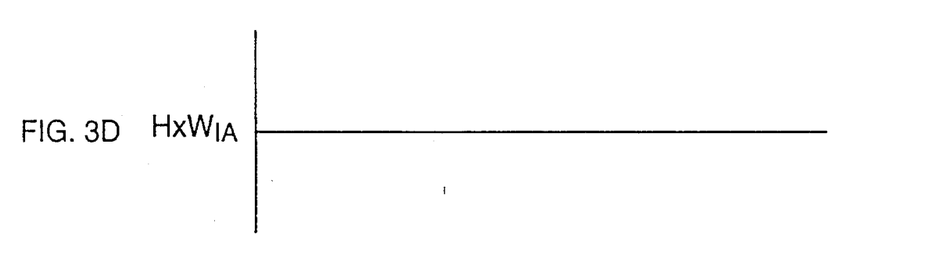

FIGS. 3A through 3D illustrate various values for this first operational case, for a zero specific force input. This creates zero pendulous torque, FIG. 3A. The gyroscope wheel is constantly oscillating with an angular momentum H as shown in FIG. 3B. Since there is no specific force input, there is no signal coming out of the signal generator along the output axis to oscillate the gyroscope about input axis IA. Accordingly, the oscillating input rate $W_{IA}$ of the gyroscope is zero, and therefore there is no cross product gyroscope precessional torque $H \times W_{IA}$.

Figure 4A:
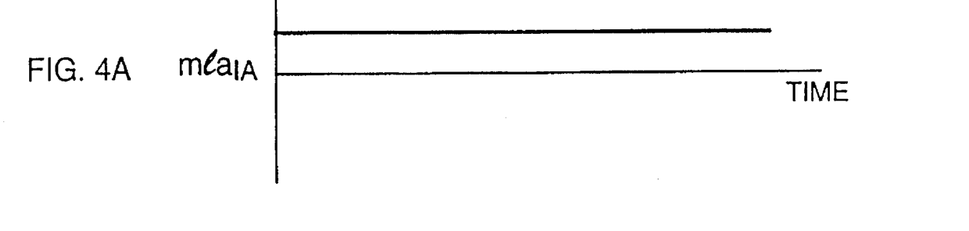
FIGS. 4A through 4D are the same graphs but for a constant specific force input.
Figure 4B:
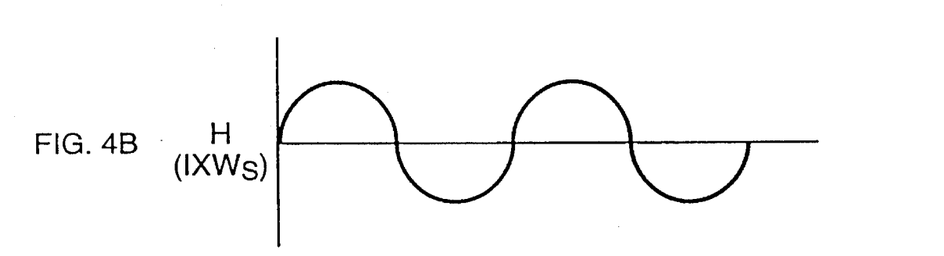

FIGS. 4A through 4D are the same graphs as FIGS. 3A through 3D, except that they illustrate the result of a constant force input creating a constant pendulous torque, FIG. 4A.

Figure 4C:
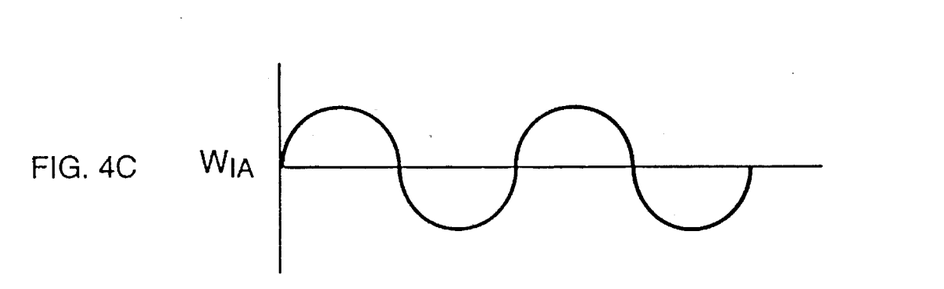
Figure 4D:
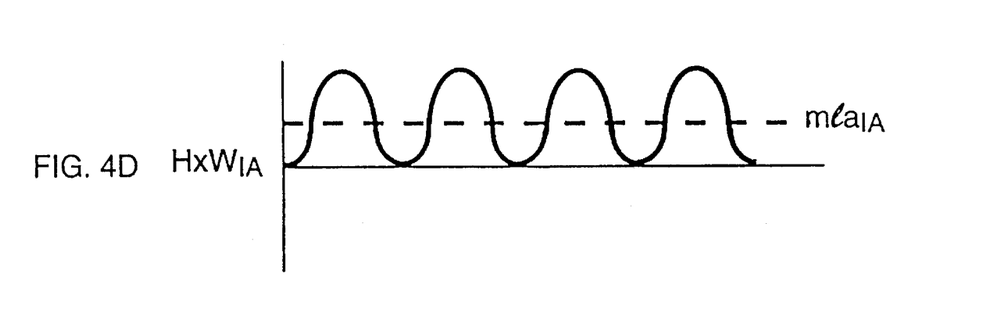

The signal from output axis OA to the oscillation control servo loop in this case drives the gyroscope in an oscillatory manner about its input axis IA as shown in FIG. 4C. The gyro oscillation is 100% in phase with the momentum mass oscillation. The in-phase coupling between the oscillating momentum mass and the oscillating gyroscope generates precessional torque, FIG. 4D, to counterbalance the pendulosity torque, FIG. 4A. The angular amplitude and angular rate amplitude of the gyro oscillation, FIG. 4C, are each proportional to the specific force being sensed.

Figure 5A:
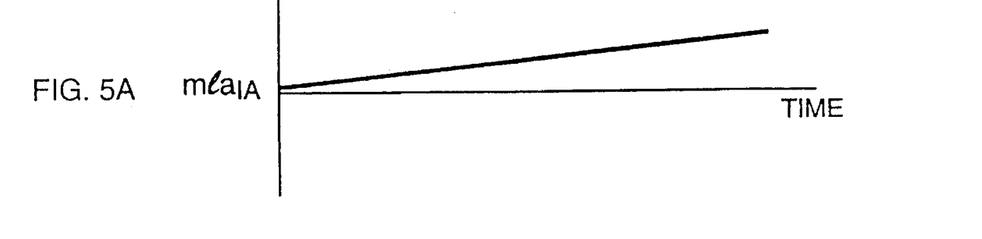
FIGS. 5A through 5D are again the same graphs but for a linearly increasing specific force input.
Figure 5B:
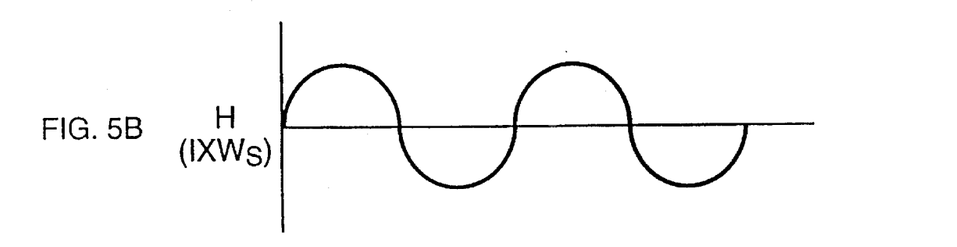
Figure 5C:
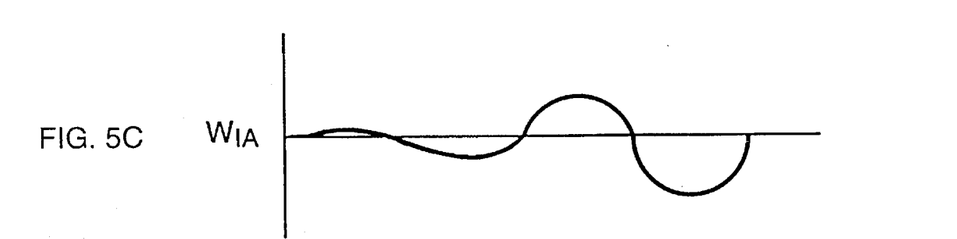
Figure 5D:
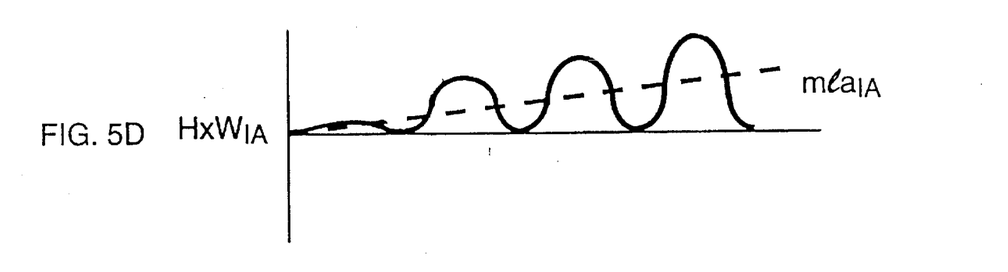

A third example fully illustrating this in-phase operational case is shown in FIGS. 5A through 5D, in which there is a linearly increasing specific force input that creates a linearly increasing pendulosity torque, FIG. 5A. The signal from the signal generator indicating the angle about output axis OA to the servo loop drives the gyroscope in a linearly-increasing oscillatory manner about the input axis, but always 100% in phase with the constant oscillation of the momentum mass as shown in FIGS. 5B and 5C. As with the previous figure, the in-phase coupling between the oscillating momentum mass and the linearly-increasing oscillating gyro generates precessional torque to counter balance the linearly increasing pendulosity torque. The increasing angular amplitude and angular rate amplitude of the gyro oscillation, FIG. 5C, are each a measure of the specific force being sensed.

The second operational case, in which the momentum mass and the gyro are oscillating at the same frequency, is shown in FIGS. 6 through 8. In this second case, the momentum mass and the gyroscope case are made to oscillate at the same frequency and with fixed oscillation amplitudes. Changes in precessional torque to balance out pendulous torque change is produced by varying the amount of in-phase relationship between the oscillating momentum mass and the oscillating gyroscope.

Figure 6A:
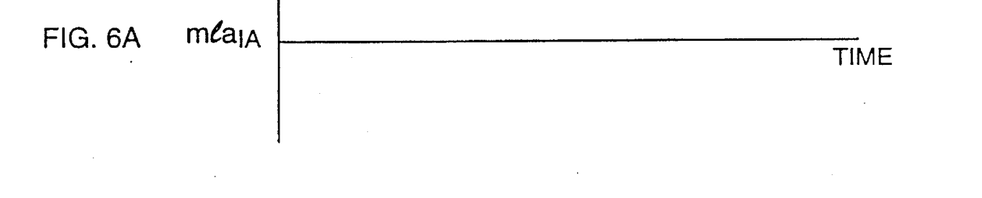
FIGS. 6A through 6D are the same graphs but for a second operational case in which the gyro oscillation is of a fixed amplitude and at the same frequency as the wheel oscillation, in which the phase relationship between the wheel and gyro oscillations are variable, for the case of zero specific force input.
Figure 6B:
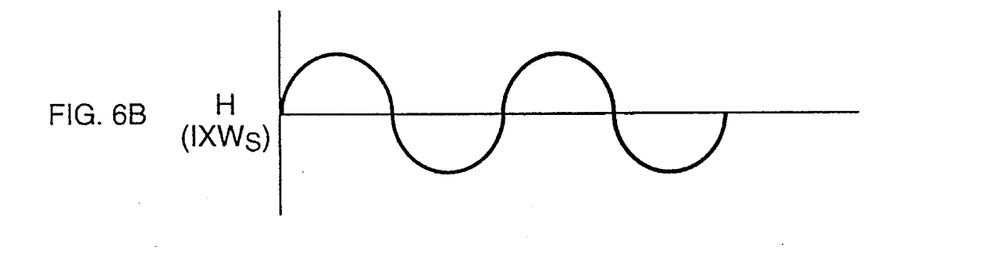
Figure 6C:
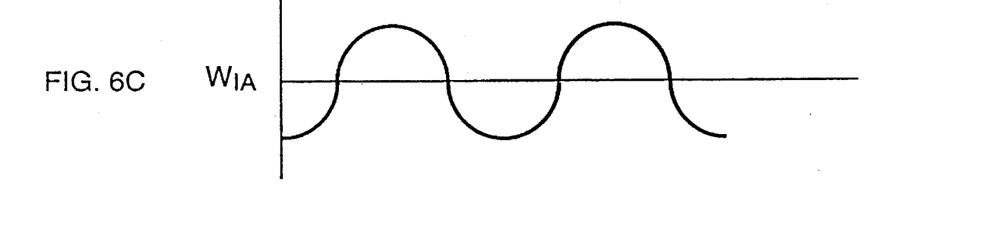
Figure 6D:
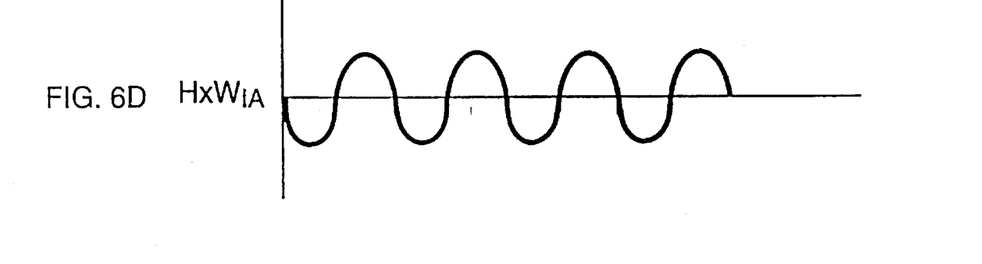
Figure 7A:
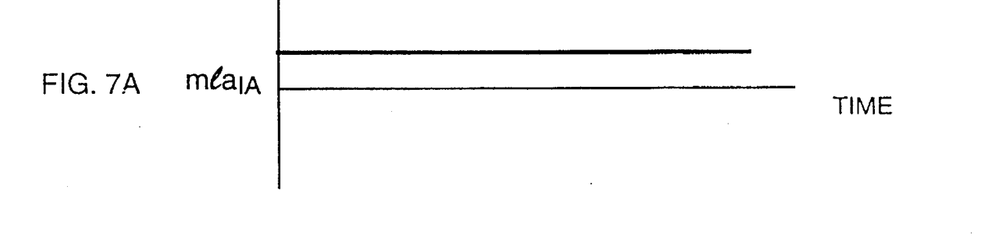
FIGS. 7A through 7D are equivalent to FIGS. 4A and 4D for this second operational case.
Figure 7B:
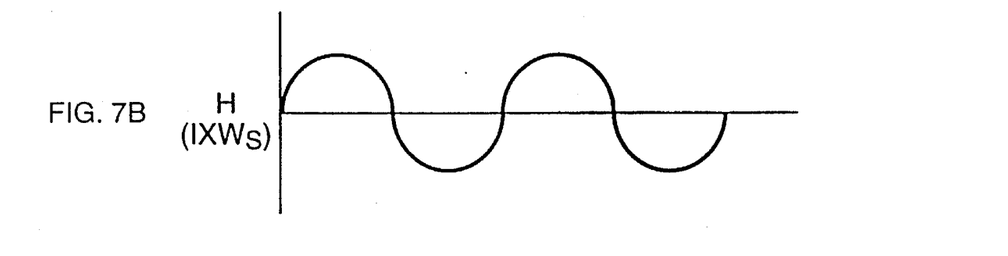
Figure 7C:
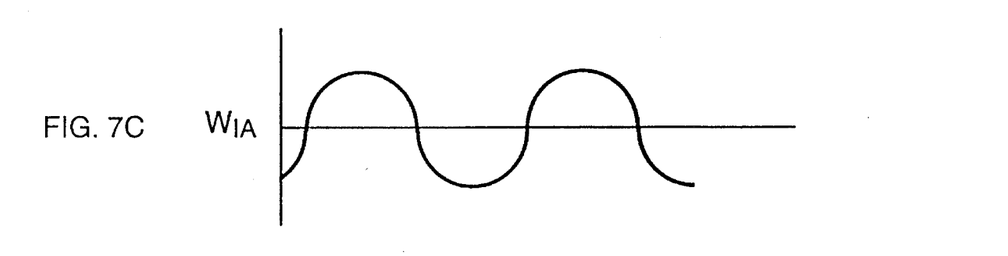
Figure 7D:
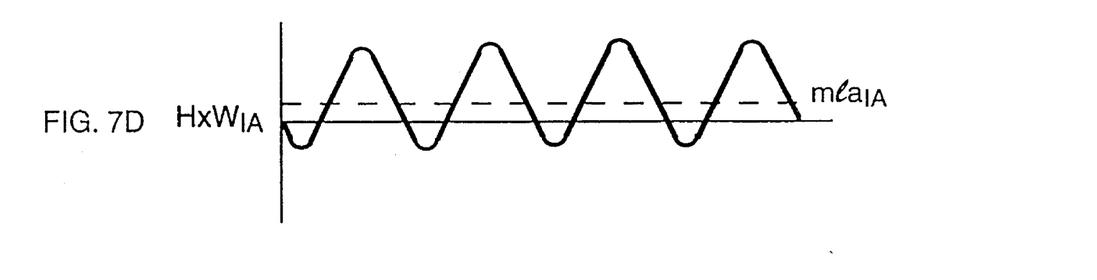

For zero specific force input, FIGS. 6A through 6D, the momentum mass oscillation, FIG. 6B and the gyro oscillation, FIG. 6C, are 90° out of phase, and no net torque is generated as illustrated in FIG. 6D.

For a constant positive specific force input, FIGS. 7A through 7D, the signal to the servo loop indicating the torque summing member tilt about axis OA shifts the gyroscope oscillation to be more in phase with the momentum mass oscillation in order to generate the precessional torque necessary to counterbalance the pendulosity torque. The amount of in phase component of the gyroscope oscillation and the percent in phase between the gyroscope and the momentum mass oscillation are each a measure of a specific force being sensed.

Figure 8A:
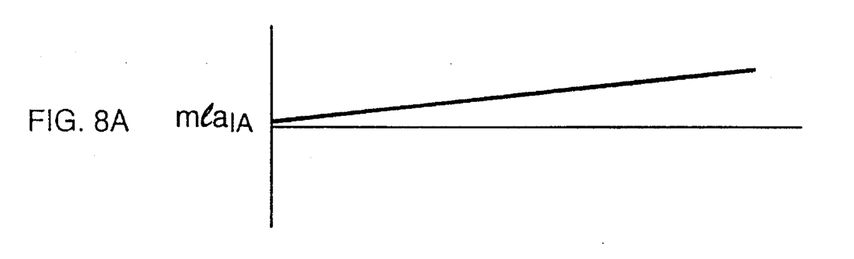
FIGS. 8A through 8D are equivalent to FIGS. 5A through 5D for this second operational case.
Figure 8B:
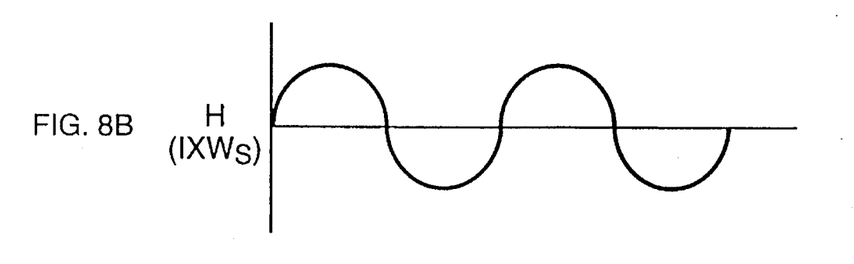
Figure 8C:
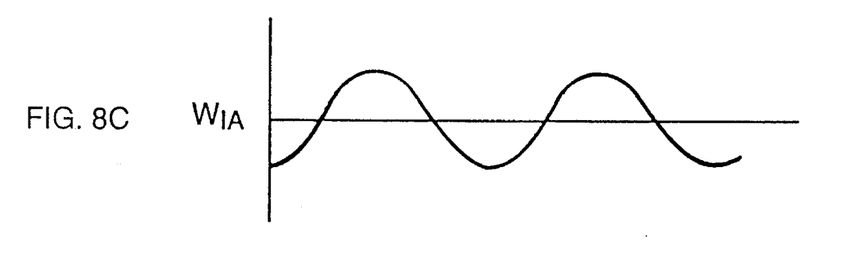
Figure 8D:
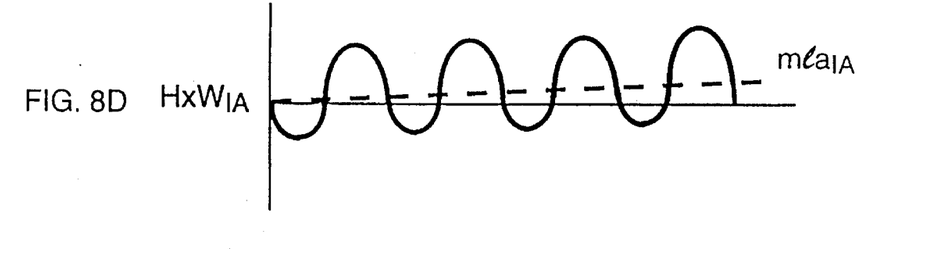

FIGS. 8A through 8D illustrate this second operational case for the situation in which there is a linearly increasing specific force input generating a linearly increasing pendulous torque, FIG. 8A. In this case, the signal from the torque summing member output axis OA to the servo loop shifts the gyroscope oscillation in a linearly-increasing in-phase relationship to the momentum mass oscillation. The in-phase relationship between the oscillations is zero at zero specific force input, and is 100% in phase at the maximum specific force which can be sensed by the gyroscope (the point at which the maximum precessional torque is generated).

The gyroscope configurations shown in FIGS. 1A and 1B are simple, virtually two dimensional devices that are capable of being micro or milli machined using standard batch fabrication techniques, greatly reducing the cost of the device. Since no floatation is required or desired, the torque summing member 14 does not have to be enclosed or supported by the heavy viscous fluid found in the currentlyavailable pendulous gyroscopes. Further, there are no bearings or slip-rings, which eliminates many assembly steps in the fabrication process as well as the major wear out modes in the rotational gyroscopes.

The operating power is much lower first because of the greatly reduced size and weight of the device. For example, a typical pendulous integrating gyroscopic accelerometer has a volume of 10 to 20 in$^3$, weighs 1 to 3 pounds, and consumes 5 to 10 watts as opposed to the device of FIG. 1A, which has a volume of about 0.1 in$^3$, weighs about 0.01 pounds, and consumes less than 0.5 watts. Further, by making pivot connecting members 26 and 24 of spring steel or the like, the gyroscope can be oscillated at its resonant frequency which allows the device to use the spring energy of mounts 24 and 26 to reduce energy consumption by orders of magnitude. In addition, smaller oscillating members 25 and 27 can be used, therefore there is less heat to dissipate.

The gyroscope could also be operated in a manner in which the gyro case was constantly oscillated, and the momentum mass oscillation was controlled to accomplish the torque balancing.

There are a number of manners in which the momentum mass 12 can be caused to oscillate. In one example, mass 12 may be a permanent magnet that could be oscillated with magnetic fields created on member 14. The signal generator built in to pivot 20 then would sense rotation about the output axis in a manner known in the art, such as by using electromagnetic, capacitive or optical sensing devices. Tunneling sensors could be used for detecting extremely small motions.

There is no requirement for the device of this invention to have the configuration shown in FIGS. 1A and 1B. It is merely necessary to have a mass that is oscillatable in two transverse (preferably perpendicular) axes, and rotatable about the output axis, in which there is also a pendulosity about the output axis. This could be accomplished in a more one dimensional format with the beam or dumbbell-shaped mass of FIG. 1B. Alternatively, the oscillating member and the gyro case could be concentric cylinders and still accomplish the design goals of this invention. Other constructions would also be envisioned by those skilled in the art.

The device of this invention may also be used as a stable reference device. If the gravity or acceleration is accurate or stable, and the oscillation of the gyro assembly is held constant, variations in the pendulosity of the device may be measured as reference parameters. In this case as well, the oscillating momentum mass momentum excitation parameters such as frequency, voltage and current may be measured as reference parameters. In the case in which the oscillation of the momentum mass is held constant, the gyroscope assembly oscillation excitation parameters such as frequency, voltage and current may be measured as reference parameters.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A pendulous oscillating gyroscopic accelerometer, comprising:

a disc member unbalanced with respect to an input axis;

a torque summing member to which said disc member is mechanically coupled;

means for oscillating said disc member about a reference axis, the oscillation having a first amplitude and a first frequency;

a gyroscope case;

a pair of pivot mounts for pivotably mounting said torque summing member and said disc member to pivot on an output axis perpendicular to the reference axis;

means for resolving an angle of the pivot movement of said torque summing member in relation to said gyroscope case;

a fixed member;

at least one flexure mount for pivotably, flexibly mounting said gyroscope case to said fixed member to allow said gyroscope case to pivot about the input axis perpendicular to the reference axis;

at least one oscillating member for applying torque to said flexure mount to oscillate said gyroscope case about the input axis, the oscillation having a second amplitude and a second frequency; and means, responsive to said means for resolving, for determining acceleration along the input axis.

2. The pendulous oscillating gyroscopic accelerometer of claim 1 in which said first frequency and said second frequency are the same, and in which said oscillation of said disc member, and said oscillation of said gyroscope case are in phase.

3. The pendulous oscillating gyroscopic accelerometer of claim 1 in which said first amplitude is constant, said second amplitude is constant, and said first frequency and said second frequency are the same.

4. The pendulous oscillating gyroscopic accelerometer of claim 2 in which said means for determining acceleration includes means for altering the oscillation amplitude of said gyroscope case to generate precessional torque to counterbalance pendulosity torque from movement of at least said disc member about the output axis.

5. The pendulous oscillating gyroscopic accelerometer of claim 3 wherein the oscillation of said disc member and the oscillation of said gyroscope case have a phase relationship, and in which said means for determining acceleration includes means for altering the phase relationship between the oscillation of said disc member and the oscillation of said gyroscope case to generate precessional torque to counterbalance pendulosity torque from movement of at least said disc member about the output axis.

6. A pendulous oscillating gyroscopic accelerometer, comprising:

a momentum mass;

a pendulous mass pivotable about an output axis;

means for oscillating said momentum mass about a reference axis transverse to said output axis, the oscillation having a first amplitude and a first frequency;

means for oscillating said momentum mass and said pendulous mass together about an input axis transverse to said reference axis, the oscillation having a second amplitude and a second frequency; and means, responsive to at least one of said means for oscillating, for determining acceleration along said input axis.

7. The pendulous oscillating gyroscopic accelerometer of claim 6 in which said first frequency and said second frequency are the same.

8. The pendulous oscillating gyroscopic accelerometer of claim 7 in which said oscillation of said momentum mass and said oscillation of said momentum mass and said pendulous mass together are in phase.

9. The pendulous oscillating gyroscopic accelerometer of claim 8 in which said means for determining acceleration includes means for resolving the pendulous mass movement about the output axis.

10. The pendulous oscillating gyroscopic accelerometer of claim 9 in which said means for determining acceleration further includes means, responsive to said means for resolving, for altering the oscillation amplitude of the momentum mass about the input axis to generate precessional torque to counterbalance pendulosity torque from movement of at least the pendulous mass about the output axis.

11. The pendulous oscillating gyroscopic accelerometer of claim 6 in which said means for determining acceleration includes means for resolving the pendulous mass movement about the output axis.

12. The pendulous oscillating gyroscopic accelerometer of claim 11 wherein the oscillation of said momentum mass about the reference axis, and the oscillation of said momentum mass and said pendulous mass together about the input axis have a phase relationship, and in which said means for determining acceleration further includes means, responsive to said means for resolving, for altering the phase relationship between the oscillation of said momentum mass about the reference axis and the oscillation of said momentum mass and pendulous mass together about the input axis to generate precessional torque to counterbalance pendulosity torque from movement of at least the pendulous mass about the output axis.

13. The pendulous oscillating gyroscopic accelerometer of claim 6 in which said momentum mass includes a disc centered on the reference axis.

14. The pendulous oscillating gyroscopic accelerometer of claim 13 in which said disc includes a pendulosity mass centered on the reference axis.

15. The pendulous oscillating gyroscopic accelerometer of claim 6 further including a torque summing member to which said momentum mass is mechanically coupled.

16. The pendulous oscillating gyroscopic accelerometer of claim 15 further including a pendulous gyroscopic accelerometer case to which said torque summing member is mechanically coupled.

17. The pendulous oscillating gyroscopic accelerometer of claim 16 in which said torque summing member is pivotably mounted to said pendulous gyroscopic accelerometer case along the output axis.

18. The pendulous oscillating gyroscopic accelerometer of claim 17 further including pivot mounting means to pivotably mount said gyroscopic case along the input axis.

19. The pendulous oscillating gyroscopic accelerometer of claim 18 in which said means for oscillating said momentum mass about the input axis includes means for oscillating said pendulous gyroscopic accelerometer case on said pivot mounting means.

20. The pendulous oscillating gyroscopic accelerometer of claim 17 in which said means for oscillating said momentum mass about the reference axis includes means in said torque summing member for oscillating said momentum mass.

21. The pendulous oscillating gyroscopic accelerometer of claim 6 in which said momentum mass includes a beam member pivotable on the output axis.

22. The pendulous oscillating gyroscopic accelerometer of claim 6 in which said means for determining acceleration includes means for resolving the tilt angle of said pendulous mass about the output axis.

23. The pendulous oscillating gyroscopic accelerometer of claim 6 in which the reference axis is perpendicular to the input axis.

24. The pendulous oscillating gyroscopic accelerometer of claim 6 in which said first amplitude is constant, said second amplitude is constant, and said first frequency and said second frequency are the same.

* * * * *